United States Patent
Bonnin et al.

[11] Patent Number: 5,876,613
[45] Date of Patent: Mar. 2, 1999

[54] SLUDGE DIGESTION METHOD

[75] Inventors: Christophe Bonnin, Chennevieres sur Marne; Gabriel Coriton, Blanc-Mesnil, both of France

[73] Assignee: Omnium De Traitements et de Valorisation, Saint Maurice Cedex, France

[21] Appl. No.: 930,444

[22] PCT Filed: Jun. 29, 1996

[86] PCT No.: PCT/FR96/00484

§ 371 Date: Jan. 16, 1998

§ 102(e) Date: Jan. 16, 1998

[87] PCT Pub. No.: WO96/30311

PCT Pub. Date: Oct. 3, 1996

[30] Foreign Application Priority Data

Mar. 31, 1995 [FR] France ................................ 95 04073

[51] Int. Cl.⁶ .................................................. C02F 11/14
[52] U.S. Cl. ...................... 210/609; 210/752; 210/764
[58] Field of Search ............................... 210/609, 749, 210/752, 764, 631

[56] References Cited

U.S. PATENT DOCUMENTS

| | | | |
|---|---|---|---|
| 3,801,501 | 4/1974 | Kennedy | 210/764 |
| 4,370,233 | 1/1983 | Hayes et al. | 210/609 |
| 4,500,428 | 2/1985 | Lynch et al. | 210/752 |
| 4,681,687 | 7/1987 | Mouche et al. | 210/764 |
| 5,087,378 | 2/1992 | Kovacs | 210/609 |
| 5,281,341 | 1/1994 | Reimérs et al. | 210/764 |
| 5,422,015 | 6/1995 | Angell et al. | 210/764 |
| 5,423,992 | 6/1995 | McMahon et al. | 210/764 |
| 5,558,772 | 9/1996 | Bean et al. | 210/764 |
| 5,756,526 | 5/1998 | Williams et al. | 210/764 |

FOREIGN PATENT DOCUMENTS

| | | |
|---|---|---|
| 2524459 | 10/1983 | France . |
| 2709304 | 3/1995 | France . |
| WO 94/19287 | 9/1994 | WIPO . |
| WO 95/04706 | 2/1995 | WIPO . |

OTHER PUBLICATIONS

27 Feb. 1985, Database WPI/Derwent Publications Ltd., 85–089562, London, Great Britain, JP A 60,038,100, 1 Page.

Primary Examiner—Christopher Upton
Attorney, Agent, or Firm—Merchant, Gould, Smith, Edell, Welter & Schmidt

[57] ABSTRACT

The invention relates to a process for the stabilization of sludge or other waste with a high organic matter content derived from treatment operations of industrial and/or urban effluent, or from drinking water treatment operations of surface or ground water, said sludge containing at least one part dry matter essentially made up of fermentable organic matter, characterized in that it is conducted at ambient temperature and atmospheric pressure, and in that it comprises a stage consisting of acidifying said sludge with at least one strong acid to a pH of between 1.5 and 3.5, a stage consisting of adding at least one nitrite salt to said sludge at a concentration of between 10 and 500 mg $N.NO_2/l$ sludge, and in that it consists of maintaining the mixture made up of said sludge, said acid and said nitrite salt in contact for a period of between 5 minutes and 12 hours, under permanent or intermittent mixing.

18 Claims, 2 Drawing Sheets

SLUDGE DIGESTION METHOD

BACKGROUND OF THE INVENTION

1. Field of the Invention

The invention relates to the treatment of sludge with a high content of fermentable organic matter, in particular sludge derived from processes for urban and industrial waste water treatment, drinking water treatments using surface or ground water, or sludge derived from network cleaning operations. The invention also applies to the treatment of other waste from treatment facilities such as screen debris, fats and sand.

More precisely, the invention relates to a process for stabilizing such sludge or waste, that is to say in particular for its deodorization or sanitization.

In France, the quantity of sludge produced by wastewater and drinking water plants is over one million tonnes of dry matter per year. Approximately, one half of this sludge is put to agricultural use while 35% is stored in waste tips. As the production of this sludge is on the increase, it should not cause a hazard for the environment or human health. This sludge contains germs of which some are pathogenic (Coliform bacteria, salmonellae, helminth eggs. . . ). In addition, it is highly fermentable and is a source of gas generation (amines, hydrogen sulphide, mercaptans) giving rise to olfactory nuisances.

These considerations account for the necessity, for the above-mentioned treatment sectors, to make provision for at least one stage of sludge stabilization intended to obtain sludge that is no longer undergoing change, or at least undergoing very slow change, both at biological level and at physico-chemical level.

This sludge is made up of a soluble part and a dry matter part. The dry matter comprises approximately 30% mineral compounds and approximately 70% of so-called "volatile" organic matter. Traditionally, the main objective of sludge stabilization treatments is in particular to reduce its fermentable ability by oxidizing the organic matter for its improved bio-assimilation or by eliminating the reducing germs which are the cause of fermentation.

As specified above, sludge stabilization treatments are also intended to meet two main objectives:

sludge sanitization by reducing the number of potentially pathogenic germs;

sludge deodorization by reducing its fermentable capacity, that is to say by reducing the number of reducing bacteria (in particular sulphato-reducing germs) and/or by reducing organic matter concentration.

Also, the stabilization stage must, for reasons relating to operating costs, cause the least possible deterioration to sludge dehydrating capacity This parameter has a direct effect on polymer consumption required by treatment processes to convert sludge to other uses or to store as waste.

2. Description of the Prior Art

There are numerous stabilization processes in the state of the art for such sludge. They are essentially classified as follows:

aerobic digestion anaerobic digestion chemical packaging thermal packaging

More recently, two new processes were examined but have not yet, as at the date of filing of this present application, been properly developed at industrial level.

one is a stabilization process known to men of the art under the name SYNOX the other is a stabilization process using gaseous nitrogen oxides.

All these processes can be applied to sludge having a relatively high concentration of dry matter, frequently between 50 and 100 g/l. This therefore requires that this sludge is submitted to preliminary thickening treatment generally by settling or flotation. Treatment facilities must therefore be designed so that they are of sufficient size to allow a minimum contact time of 24 hours.

Aerobic digestion reduces organic matter concentration and consists of extended aeration of sludge so that the development of the aerobic microorganisms it contains can be continued until elimination of the organic matter substrate, achieving self-oxidation of these microorganisms.

Aerobic stabilization can be conducted at 30°–40° C. (mesophil stabilization) or at 45°–60° C. (thermophil stabilization). In the latter case, the temperature increase leads to partial sanitization of the sludge.

The stay length of the sludge in aerobic stabilization reactors is generally 10 to 15 days which achieves 30 to 40% elimination of organic matter, 90–96% elimination of sulphurated matter emission, and a reduction of over 2 log in faecal germs. If the facilities in which this aerobic stabilization is carried out are covered and insulated, the degradation of organic matter produces an increase in temperature which accelerates the digestion process. The length of stay can therefore be reduced by half, down to 5 to 6 days.

Anaerobic stabilization consists of degrading organic matter with strictly anaerobic bacteria under specific environmental conditions ( redox potential in the region of—250 mV, neutral pH) until the formation of methane. Methanisation of the organic matter can take place under ambient, mesophil or thermophil conditions and requires a stay length of 20 to 30 days. Under these conditions, degradation of organic matter generally reaches 40 to 50%. The odour index is reduced by 70 to 80% and pathogenic germs by 1 to 2 log.

Chemical packaging using lime is used at different stages of sludge treatment. Lime (quicklime) can trap the water contained in the sludge during a disintegration reaction and greatly increases its siccative properties. In addition to this increased drying, quicklime plays a powerful stabilizing role through strong alkalinization of the medium, which allows extensive destruction of pathogenic agents (sanitization) and of the microorganisms responsible for anaerobic fermentation leading to a decrease in the emission of sulphur pollutants. The use of quicklime generally enables faecal germs to be reduced by 4 to 5 log and the flow of sulphurated molecules ($H_2S$, mercaptans) by over 90%. However, the rise in pH which results from its use causes the release of ammonia and therefore an olfactory nuisance. Also, the addition of quicklime leads to an increase in sludge mass in proportion to treatment level of at least 30%. Moreover, the stabilization obtained with quicklime is fairly short-lived, generally 8 to 30 days according to the proportion of quicklime added.

Sludge treatment by thermal packaging consists of treating sludge at high temperature (150°–220° C.) under high pressure (15 to 20 bars) for 30 to 40 minutes to achieve sanitization and partial conversion of the organic matter it contains into biodegradable, soluble compounds (alcohols, aldehydes, volatile fatty acids) so as to destroy the colloid slats and thereby improve subsequent stages of thickening and dehydration. The main drawback of the process lies in the olfactory nuisances generated by resulting organic molecules such as butyraldehydes, butyric compounds, valeraldehydes. . . and its very high energy cost which means that this process is increasingly less used.

Among the above-mentioned processes recently developed, the SYNOX process consists of treating raw sludge in several stages comprising:

pretreatment of sludge including a decrease in pH of between 2.5 and 3, adjusting dry matter content up to 2.5–3.5% by weight, and heating the sludge to a temperature of 40° C.;

oxidation of the sludge by contact with 5% ozonated air for 30 to 60 minutes, with a view to reducing its organic matter concentration; pre-treatment and oxidation are conducted in a reactor under pressure (6 to 9 bars);

optional post-treatment using sodium nitrite which is added to reduce the concentration of viruses.

ammonia, thermal packaging requiring high energy consumption and generating volatile fatty acids).

increase in sludge volume—quickliming)

limited time duration of stabilization high complexity and high implementation costs sometimes mediocre performance regarding deodorization and sanitization.

Also, these processes frequently lead to refermenting of the stabilized sludge over time and during storage in areas provided for this purpose. Table 1 below summarises the performances of the chief processes in the current state of technique:

TABLE 1

|  | Anaerobic digestion | Aerobic stabilization | Quickliming | SYNOX | NOX |
| --- | --- | --- | --- | --- | --- |
| Type of sludge | thickened | thickened | dehydrated | raw | raw |
| Length of stay days | 20 to 30 hours | 6–12 days | — | 60' to several | 4 h |
| Volatile m. variation | 45–50% | 35–40% | — | — | — |
| Deodorization | H2S:1-2 log | H2S:2-3/4–5 log. | H2S >5 log | — | H2S = 5 log CH3SH = 4 log |
| Sanitization |  | T < 30°/T > 50° C. |  |  |  |
| Coliform | 1.5 log | 0.5 to 1/3 to 5 | 3 log | 5 log | >5–6 log |
| Streptococci | 1.5 log | log | 3 log | >5–6 log | 3 log |
| Clostrid. Sp. | <0.5 log | 0.5 to 1/3 to 5 log 3 to 5 log | — | >4–5 log | 1 log |

The main disadvantage of this process is that it is very complex both in design and implementation. It requires at least two reactors and is most costly from an energy viewpoint since it includes the stages of $O_3$ production, heating, and pressurizing.

Another process described in French Patent n° 9310335 filed under the name of the Applicant, recommends the use of oxides of gaseous nitrogen for sludge stabilization.

This process consists of transferring nitrogen oxides to a liquid sludge (nitrogen monoxide, nitrogen dioxide, nitrogen protoxide...) that are either pure or diluted in a mixture with another gas, and of assuring a contact time of less than 5 hours between the sludge and the nitrogen oxides.

Although it achieves very good levels of performance in respect of sludge deodorization (odour reduction: 3 to 4 log) and sanitization (germ reduction: 4 log) within a much reduced contact time (a few hours) compared with sludge stabilization processes (20 to 30 days for anaerobic stabilization, approximately 10 days for thermophil aerobic stabilization), this latter process using nitrogen oxides nevertheless has two disadvantages.

Firstly, this process implies the presence, in the air exiting the reactor, of residual nitrogen oxide which must be eliminated, necessitating fairly costly additional treatments.

Also, this process implies relatively high investment costs connected with the production of $NO_x$, in particular in the case of in situ production, by thermal oxidation of ammonia.

In conclusion, the disadvantages of known sludge stabilization processes already in operation or still only at the development stage are as follows:

long stay lengths (aerobic and anaerobic digestion)

production of malodorous gases (anaerobic digestion leading to biogas release, quickliming which produces

SUMMARY OF THE INVENTION

The object of the present invention is to make available a new process of sludge treatment which does not have the numerous disadvantages of the processes in the current state of the art.

More precisely, a first objective of the present invention is to provide a process of sludge stabilization which can reduce olfactory nuisances in truly stable manner over time and destroy pathogenic germs within a very short time compared with prior processes.

Another objective of the present invention is the use of a simple process comprising a reduced number of stages.

A further objective of the present invention is to make available said process implying reduced implementation costs in particular by not requiring preliminary oxidation treatment and operating at ambient temperature and atmospheric pressure.

Yet another objective of the invention is to allow the treated sludge to be stored in open storage areas, protected from rain, without generating nuisances.

Another objective of the invention is to make available such process able to achieve a strong decrease in the heavy metals contained in the treated sludge, which are a cause of pollution.

These different objectives are reached with the invention which relates to a stabilization process for sludge and other waste with a high organic matter content derived from industrial and/or urban effluent treatment operations or from drinking water treatment operations using surface or ground water, said sludge at least partly containing dry matter essentially made up of fermentable organic matter, characterized in that it is conducted at atmospheric temperature and pressure, and in that it comprises a stage consisting of acidifying said sludge with at least one acid to a pH of between 1.5 and 3.5, a stage consisting of adding at least one nitrite salt to said sludge at a concentration of between 10 and 500 mg $N.NO_2/l$, and in that it consists of maintaining in contact the mixture made up of said sludge, said acid and said nitrite salt for a time of between 5 minutes and 12 hours under permanent or intermittent mixing.

It will be noted that by "other waste derived from treatment operations" is meant screed debris, fats derived from fat pits and other fat removers and sand. This waste all has the common characteristic of having a high organic matter content and of generating nuisances.

In accordance with the invention, the acidification and addition of nitrite may be carried out either linear fashion, that is to say at a sludge inlet pipe leading to the reactor used to make the mixture and therefore downstream from this reactor, or directly inside the reactor.

It will be noted that preferably, in order to avoid the formation of foam and release of nitrogen oxides, the acidification stage is carried out before the addition of nitrites.

The object of the present invention therefore lies in the combined use of at least one nitrite salt and of at least one acid to deodorize and sanitize the sludge derived from varying sources (urban sludge from treatment plants, cleaning sludge, sludge from industrial effluent . . . ).

It should be noted that the acid and nitrites, when used separately, have a very low deodorizing and sanitizing capacity. This is one of the reasons why the nitrites are only used in the SYNOX process (registered trademark) as a supplementary post-treatment and only allows those germs to be eliminated which were not destroyed by treatment with ozonated air which is a very powerful oxidant.

It will also be noted that nitrites have already been used to treat mineral muds loading with gypsum ($CaSO_4$) derived from desulphurating cleaners in order to reduce the content of sulphato-reducing bacteria (which are very fragile germs) in this waste and to achieve its partial deodorization through reduction of $H_2S$ emission only.

In surprising manner, it was ascertained that it is the association of two elements (acid+nitrite) which has very powerful deodorizing and sanitizing properties, without the need for any other preliminary treatment, in particular no oxidation treatment (ozonation as used by the SYNOX process or nitrogen oxide in the process described in French patent application n°9310335).

The main advantage of the process of the invention is that it may be set in operation at atmospheric pressure and ambient temperature with no need for a pre-treatment stage of the sludge, such as for example an oxidation stage.

Moreover, the process of the invention also offers the advantage, in comparison with other processes in the state of the art, of only requiring very short contact times, from a few minutes to a maximum of a few hours.

Another advantage is that said process does not bring any decrease in the agronomic value of sludge by reducing organic matter (which is the case in biological oxidation treatments such as anaerobic digestion or in chemical oxidation treatments such as ozonation). On the contrary, treatment with nitrites does not reduce organic matter and even offers a source of additional nitrogen that can be directly assimilated by plants. The agronomic value is thereby increased and the sludge which has been deodorized and sanitized by acid treatment with nitrites in accordance with the invention may subsequently be used in agriculture either in liquid form or in solid form.

The process of the invention may especially be set in operation in accordance with two main variants depending upon the desired objective.

According to a first variant, therefore, the process is characterized in that said stage allowing acidification of said sludge is conducted in such manner as to give said sludge a pH value of between 2 and 3.5, in that said nitrite salt is added at a concentration of between 10 and 75 mg/l and in that said mixture is kept in contact for a period of between 5 minutes and 2 hours.

Preferably, in accordance with this first variant, the pH is between 2.9 and 3.1, the concentration of nitrite salt lies between 40 and 50 mg $N.NO_2A$ and the contact time is approximately 30 minutes.

Generally it will be noted that it was found that if a lower pH is used, the necessary nitrite concentration is also lower.

In accordance with this first variant, the objectives reached are as follows:

complete deodorization of the sludge (inhibited formation of $H_2S$, $CH_3SH$ and organic sulphides), elimination of faecal contamination germs (total and thermotolerant Coliforms, streptococci), elimination of parasitic eggs (helminth eggs).

These attained objectives can be maintained for several weeks and up to one year.

A second variant of the process of the invention, which achieves greater sludge sanitization, is characterized in that said stage during which said sludge is acidified, is conducted in such manner as to give said sludge a pH of between 1.5 and 2.5, in that said nitrite salt is added at a concentration of between 100 and 500 mg $N.NO_2/l$, and in that said mixture is kept in contact for a period of between 2 hours and 12 hours.

According to this second variant, the pH preferably lies between 1.9 and 2.1, the nitrite salt concentration between 300 and 400 mg N/l and said contact time lies between 3 and 6 hours.

In accordance with this second variant of implementation of the invention, the following objectives are reached:

complete deodorization of the sludge (inhibited formation of $H_2S$, $CH_3SH$ and organic sulphides), elimination of faecal contamination germs (total and thermotolerant Coliforms, stroptococci), elimination of parasitic eggs (helminth eggs, Ascaris, Taenia, Trichuris . . . ), and also, elimination of spore-forming bacteria (Clostridium spores . . . ), elimination of Protozoa (Giardia, Cryptosporidium . . . ).

These attained objectives may continue to last from several weeks up to one year.

Advantageously, the process may also include a complementary stage consisting of adding to said sludge sorbic acid and/or one of its derivatives in a concentration of between 0.1 and 5% by weight of added nitric nitrogen $N.NO_2$. The addition of at least one compound of this type allows nitrite levels to be reduced if necessary in particular in the event of more extensive sanitizing treatment as described above. Therefore, by adding sorbate at levels of 0.1 to 5% by weight of added nitric nitrogen (preferably between 0.5 and 1%) the nitrite level ca be lowered by 100 to 300 mg N/1 (with contact times similar to those for more extensive sanitization treatment as described above).

Preferably, said used derivative of sorbic acid is chosen from the group made up of ascorbic acid, sorbates, ascorbates and erythorbates.

It may also be considered, in order to increase the sanitizing action of nitrites, to add to the process a complementary stage consisting of adding to said sludge at least one metal salt, such as for example ferrous sulphate or ferric chloride.

According to a variant of the invention, the process also comprises a supplementary stage of dehydration of said sludge. Such stage may prove to be necessary in particular if it is desired to put the sludge to agricultural use in paste form. This the dehydration stage may be carried out by any means known to men of the art and in particular by centrifugation or filtration through a filter press or strip filter.

According one variant of particular interest of the invention, this dehydration stage is carried out at the acid pH of said acidification stage. At this pH value, the heavy metals in the sludge can be made soluble and evacuated in the filtrates or centrates resulting from the dehydration operation. The dehydrated sludge cleaned of its heavy metals can then be neutralized using any basic agent known to men of the art, preferably using lime, quicklime or slaked lime, in sold or liquid form.

According to another variant, the dehydration stage may also be conducted after neutralization of the sludge. In this case, any liquid or solid basic agent may be used known to men of the art such as preferably soda, potassium or whitewash.

It will be noted that, in either case, the neutralization pH is related to the level of acids and nitrites used and the method of storage used for the sludge.

Storage in liquid or paste form of sludge treated according to the present invention may by made under treatment conditions, that is to say at acid pH. However, another advantage of the invention lies in the fact that storage may also be made at higher pH values, close to neutrality, without deteriorating the deodorized and sanitized characteristic of the product.

Generally, storage conditions or methods of the sludge treated in accordance with the invention are determined by the pH of sludge storage.

If the method of storage is open air storage (sheltered from rain), the storage pH may be the treatment pH. If storage is conducted in a closed, sealed system, storage pH may be increased.

More precisely, for sanitization treatment as described above at a pH of between 2 and 3.5 with nitrite concentrations of between 10 and 75 mg/l, the storage pH may be increased to a value of between 4 and 5 if storage is in a closed system (a silo for example) or up to a maximum pH of 3.5 if storage is made in open air sheltered from rain. For more extensive sanitization treatment such as described above at a pH of between 1.5 and 2.5 with nitrite concentrations of between 100 and 500 mg/l, the storage pH in a closed, sealed system shall preferably lie between 2 and 6, and for an open air system sheltered from rain of between 2 and 4.

Also, the acid used is preferably a strong acid. This strong acid may be chosen from the group made up of sulphuric acid, hydrochloric acid and nitric acid.

Also preferably, said used nitrite salt is an alkaline metal nitrite.

The invention also relates to an installation for setting in operation said process of sludge stabilization, characterized in that it includes a stabilization reactor operating at atmospheric pressure and ambient temperature, dispensing means of at least one acid and dispensing means of at least one nitrite salt in said stabilization reactor.

Preferably, the installation also includes a neutralization reactor provided downstream from said stabilization reactor.

BRIEF DESCRIPTION OF THE DRAWINGS

The invention, and the different advantages it offers will be more easily understood with the following description of different methods of implementing the stabilization process of the invention with reference to the drawings in which.

DESCRIPTION OF THE PREFERRED EMBODIMENTS

Figure 1:
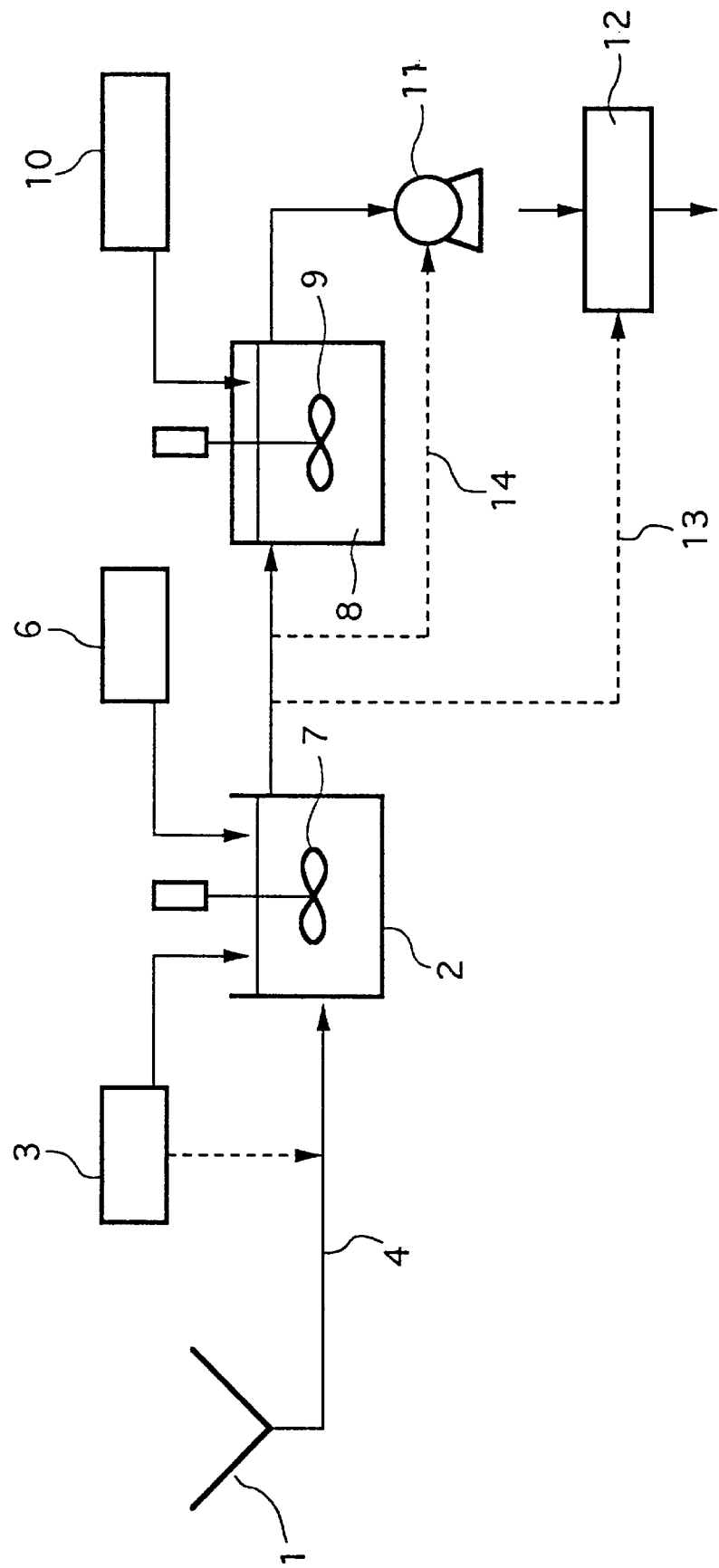
FIG. 1 represents one embodiment of a sludge stabilization installation for the implementation of the process of the invention.
Figure 2:
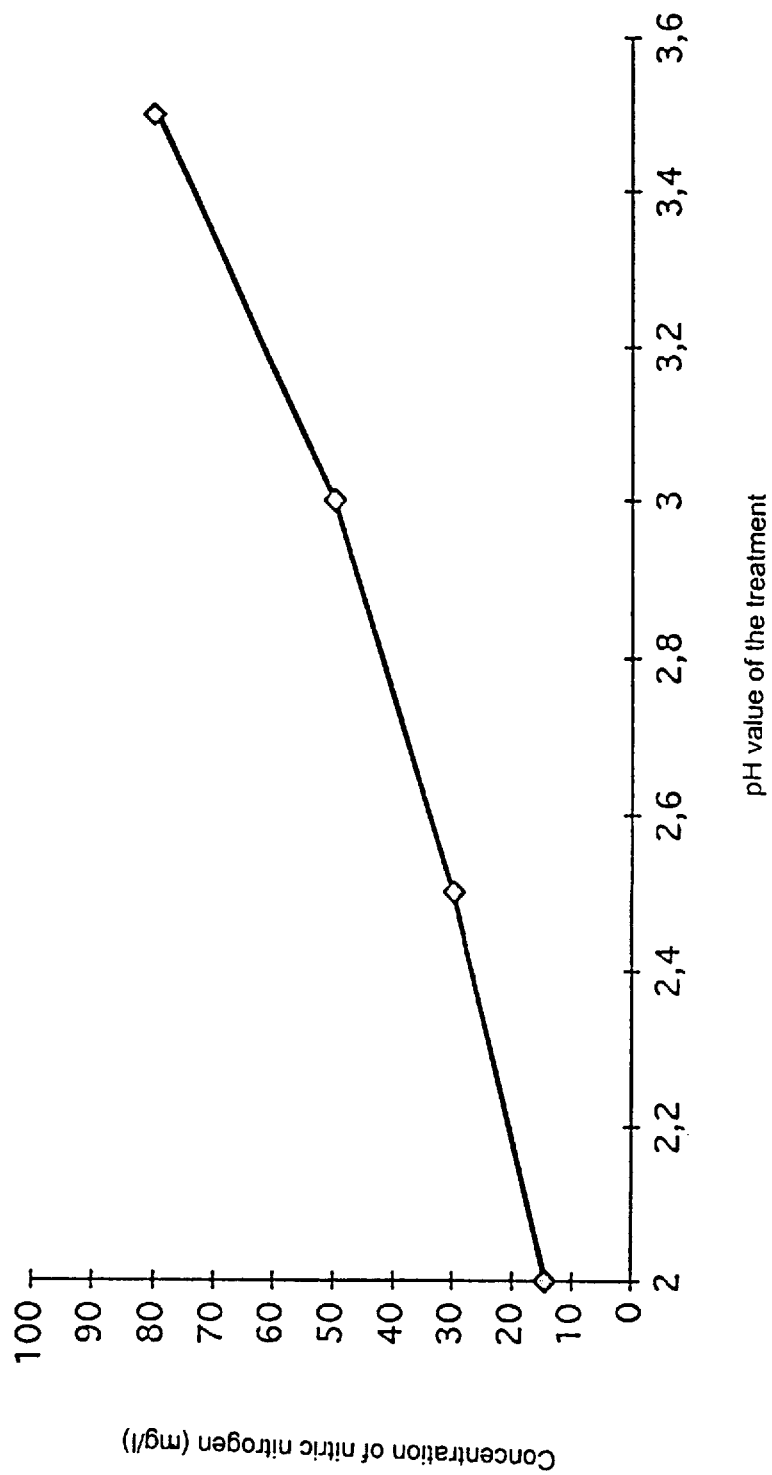
FIG. 2 is a graph showing the change in the concentration of nitric nitrogen in relation to the pH value of the treatment according to the invention.

With reference to FIG. 1, which gives an illustration of a sludge treatment chain for 3000 Inhabitant Equivalents, the thickened sludge to be treated having a content of 40 g of dry matter per litre is removed from a thickener 1 and fed to a stabilization reactor 2 at an average flow of 200 /h in which acidification and nitrite addition is carried out. For this purpose, dispenser means 3 of at least one acid are provided at pipe 4 leading from said thickener 1 to said stabilization reactor 2, and means 5 of dispensing 6 at least one nitrite salt are provided in such manner as to dispense the nitrites in the stabilization reactor. The latter is also equipped with mixing means 7.

Depending upon the desired level of sanitization, the pH value, nitrite level and contact time of the sludge with the acid and nitrite salt are adjusted accordingly.

At least one part of the stabilized sludge is subsequently directed towards a neutralization reactor 8 which is also equipped with a stirrer 9 and provided with means 10 for dispensing a neutralizing agent. The neutralized sludge is then dehydrated with a dehydrator 11 before being stored in sealed storage means 12 where it may be stored for 9 to 10 months before being spread on ploughing land.

According to two variants of the process which may be implemented with the installation described herein, it will be noted that the treated sludge may also be stored in liquid form or undergo dehydration to be stored in paste form. For this purpose, a pipe 13 leading directly from the exit of stabilization reactor 7 towards sludge storage means 12 is provided and a pipe 14 is provided which leads directly from the exit of stabilizing reactor 7 towards dehydration means 11.

The installation described was tested by carrying out different variants of the process according to the invention.

Test n° 1 was carried out with the following parameters: pH=3, nitrite salt concentration: 50 mg $N/NO_2/l$, contact time: 30 minutes.

The results obtained are summarized in Table 2 below:

TABLE 2

|  | IO (H2S) | Sulphato-reducing | Total Coliforms nb/100 ml | Thermo. Coliforms nb/100 ml | Streptoc. nb/100 ml | Clostrid. spores nb/20 ml | Helminth eggs nb/gMS |
|---|---|---|---|---|---|---|---|
| Content | <10 | <1 | <1000 | <1000 | <1000 | >>$10^6$–$10^7$ | 0.3 |
| Yield | >4.5 log | >5 log | >4 log | >4 log | >4 log | 0 | 70% |

These results point to excellent sludge sanitization except in respect of particularly resistant microorganisms such as Clostridium spores.

Test n° 2 was conducted with the following parameters: pH=2, nitrite salt concentration: 300 mg N/NO$_2$/l, contact time: 6 hours. In this test, storage conditions and duration of stabilization were also tested.

The results obtained are summarized in Table 3 below:

TABLE 3

|  | IO (H2S) | Sulphato-reducing | Total Coliforms nb/100 ml | Thermo. Coliforms nb/100 ml | Streptoc. nb/100 ml | Clostrid. spores nb/20 ml | Helminth eggs nb/gMS |
|---|---|---|---|---|---|---|---|
| Content | <10 | <1 | <1000 | <1000 | <1000 | <100 | 0.1 |
| Yield | >4.5 log | >5 log | >4 log | >4 log | >4 log | >4 log | 90% |
| Storage mode |  | open air rain protect. | open air rain protect. | open air rain protect. | closed | closed | closed |
| Storage pH |  | 2 | 4 | 6 | 2 | 4 | 6 |
| Stabilization period Sanitization |  | 4 months | >4 months | 2 months | >4 months | 4 months | >4 months |

In addition to excellent sanitization, in particular against especially resistant micro-organisms such as Clostridium spores and Protozoa, this test showed that it is possible to store the treated sludge for several months in open air at different pH values.

Test n°3 was conducted with the following parameters: pH=2, nitrite salt concentration: 150 mg N.NO$_2$/l, contact time: 6 hours, sorbate concentration: 1% by weight of added nitric acid.

The results obtained are summarized in Table 4 below.

TABLE 4

|  | IO (H2S) | Sulphato-reducing | Total Coliforms nb/100 ml | Thermo. Coliforms nb/100 ml | Streptoc. nb/100 ml | Clostrid. spores nb/20 ml | Helminth eggs nb/gMS |
|---|---|---|---|---|---|---|---|
| Content | <10 | <1 | <1000 | <1000 | <1000 | <100 | 0.1 |
| Yield | >4.5 log | >5 log | >4 log | >4 log | >4 log | >4 log | 90% |

The treated sludge was subsequently stored under different conditions and at different pH values. The stabilization times obtained are given in Table 5 below:

TABLE 5

| Storage mode | open air rain protec. | open air rain protec. | Open air rain protec. | closed | closed | closed |
|---|---|---|---|---|---|---|
| Storage pH | 2 | 4 | 6 | 2 | 4 | 6 |
| Stabilization period Sanitization | >4 months | >4 months | 2 months | >4 months | >4 months | >4 months |

Test n° 4 was conducted with the following parameters: pH=2, nitrite salt concentration: 300 mg N.NO$_2$l, contact time: 6 hours, followed by dehydration at pH2.

The results obtained regarding reduction in the heavy metal content of the treated sludge are summarized in Table 6 below:

TABLE 6

|  | Chromium | Copper | Nickel | Zinc |
|---|---|---|---|---|
| Non-treated sludge (mg/g MS) | 111 | 361 | 39 | 872 |
| Treated sludge (mg/g MS) | 42 | 342 | 21 | 319 |

These results all point to very satisfactory, extensive sanitization of the treated sludge, and in test n° 4 in addition, to a substantial decrease in the heavy metals content of this sludge.

The embodiments of the invention described herein are not intended to reduce the scope of the invention. In particular, the use may be considered of different concentrations of nitric nitrogen, different contact times and of different working pH values to those given, while remaining within the limits of the invention. It may also be considered to store sludge at different pH values to those recommended in the examples.

We claim:

1. Process for the stabilization of sludge or other waste with a high organic matter content derived from treatment operations of industrial and/or urban effluent, or from drinking water treatment operations of surface or ground water, said sludge containing at least one part dry matter essentially made up of fermentable organic matter, characterized in that it is conducted at ambient temperature and atmospheric pressure, and in that it comprises a stage consisting of acidifying said sludge to a pH of between 1.5 and 3.5 by the addition of at least one acid to said sludge, a stage consisting of adding at least one nitrite salt to said sludge at a concentration of between 10 and 500 mg $N.NO_2/l$ sludge, and in that it consists of maintaining the mixture made up of said sludge, said acid and said nitrite salt in contact for a period of between 5 minutes and 12 hours, under permanent or intermittent mixing.

2. Process according to claim 1, characterized in that said acidification stage is carried out before said stage of nitrite addition.

3. Process according to claim 1, characterized in that said stage for acidifying said sludge is carried out in such manner as to give said sludge a pH value of between 2 and 3.5, in that said nitrite salt is added at a concentration of between 10 and 75 mg $N.NO_2/l$ sludge, and in that said mixture is kept in contact for a period of between 5 minutes and 2 hours.

4. Process according to claim 3, characterized in that said concentration of nitrite salt lies between 40 and 50 mg $N.NO_2/l$ sludge, and in that said pH lies between 2.9 and 3.1., and said contact time is approximately 30 minutes.

5. Process according with claim 3, characterized in that it comprises a stage consisting of increasing the pH of the treated sludge before storage up to a maximum value of 3.5 if storage is made in open air protected from rain, and a maximum value of 5 if storage is to be made in a closed system.

6. Process according to claim 1, characterized in that said stage for acidifying said sludge is carried out in such manner as to give said sludge a pH value of between 1.5 and 2.5, in that said nitrite salt is added at a concentration of between 100 and 500 mg $N.NO_2/l$ sludge, and in that said mixture is kept in contact for a period of between 2 hours and 12 hours.

7. Process according to claim 6, characterized in that said stage for acidifying said sludge is carried out in such manner as to give said sludge a pH value of between 1.9 and 2.1., the nitrite salt is added to the proportion of 300 to 400 mg $N.NO_2/l$ sludge, and said contact time is between 3 and 6 hours.

8. Process according to claim 6, characterized in that it comprises a stage consisting of increasing the pH of treated sludge before it is stored up to a maximum value of 4 if storage is made in open air protected from rain, and a maximum value of 6 if storage is to be made in a closed system.

9. Process according to claim 1, characterized in that it includes a complementary stage consisting of adding to said sludge sorbic acid and/or one of its derivatives at a concentration of between 0.1 and 5% by weight of added nitric nitrogen N. $NO_2/l$.

10. Process according to claim 9, characterized in that the sorbic acid and/or one of its derivatives is added at a concentration of between 0.5 and 1% by weight of added nitric nitrogen $N.NO_2$.

11. Process according to claim 9, characterized in that said derivative of sorbic acid is chosen from the group made up of ascorbic acid, sorbates, ascorbates and erythorbates.

12. Process according to claims 1; characterized in that it includes a complementary stage consisting of adding to said sludge at least one metal salt.

13. Process according to any of claims 1, characterized in that it comprises a supplementary dehydration stage of said sludge.

14. Process according to claim 13, characterized in that said dehydration stage is conducted at the acid pH of the treatment, and in that a neutralization stage is conducted after said dehydration stage.

15. Process according to claim 13, characterized in that a neutralization stage is carried out before said dehydration stage.

16. Process according to claim 1, characterized in that it includes a neutralization stage intended to increase the pH value of said sludge using a neutralizing agent intended to increase the pH of the acidified sludge.

17. Process according to claims 1, characterized in that said acid is a strong acid.

18. Process according to claim 1, characterized in that said nitrite salt is an alkaline metal nitrite.

* * * * *

UNITED STATES PATENT AND TRADEMARK OFFICE
CERTIFICATE OF CORRECTION

PATENT NO. : 5,876,613

DATED : MARCH 2, 1999

INVENTOR(S) : BONNIN ET AL.

It is certified that error appears in the above-identified patent and that said Letters Patent is hereby corrected as shown below:

Front page, [22] PCT Filed: "Jun. 29, 1996" should read —Mar. 29, 1996—

Col. 4, Table 1, line 6: insert —days— after the words "20 to 30"

Col. 4, Table 1, line 7: delete "days" under the words "length of stay"

Col. 4, Table 1, line 7: delete "hours" under the words "20 to 30"

Col. 4, Table 1, line 7: insert —hours— under the numeral "60'"

Col. 6, line 8: "N.NO$_2$A" should read —N.NO$_2$/1—

Col. 6, line 49: "N.NO$_2$" should read —N.NO$_2$/1—

Col. 6, line 54: "ca" should read —can—

Col. 7, line 5: insert —to— after the word "According"

Col. 7, line 12: "sold" should read —solid—

Col. 8, line 23: "200/h" should read —2001/h—

Col. 8, line 53: "N/NO$_2$/1," should read —N.NO$_2$/1—

UNITED STATES PATENT AND TRADEMARK OFFICE
CERTIFICATE OF CORRECTION

PATENT NO. : 5,876,613

DATED : MARCH 2, 1999

INVENTOR(S) : BONNIN ET AL.

It is certified that error appears in the above-identified patent and that said Letters Patent is hereby corrected as shown below:

Col. 9, line 5: "N/NO$_2$/1," should read —N.NO$_2$/1—

Col. 9, line 60: "N.NO$_2$1," should read —N.NO$_2$/1—

Col. 12, line 13, claim 10: "N.NO$_2$" should read —N.NO$_2$/1—

Col. 12, line 21, claim 13: "any of claims 1" should read —claim 1—

Col. 12, line 35, claim 17: "claims 1" should read —claim 1—.

Signed and Sealed this

Twenty-ninth Day of August, 2000

Attest:

Q. TODD DICKINSON

Attesting Officer

Director of Patents and Trademarks